United States Patent [19]

Pearlman et al.

[11] Patent Number: 4,792,731
[45] Date of Patent: Dec. 20, 1988

[54] MULTI-ROOM CONTROLLED FOR INDIVIDUAL LIGHT CONTROLS

[75] Inventors: Gordon W. Pearlman; Steven B. Carlson, both of Portland, Oreg.

[73] Assignee: Lightolier Incorporated, Secaucus, N.J.

[21] Appl. No.: 26,529

[22] Filed: Mar. 16, 1987

[51] Int. Cl.[4] .................. G01R 22/00; H05B 37/00
[52] U.S. Cl. .................................. 315/316; 315/314; 315/317; 315/319; 315/324; 315/288; 315/DIG. 4; 364/473
[58] Field of Search ............... 315/312, 314, 315, 316, 315/317, 318, 320, 321, 324, 288, DIG. 4; 362/85; 364/493

[56] References Cited

U.S. PATENT DOCUMENTS

| | | | |
|---|---|---|---|
| 3,284,667 | 11/1966 | Harris et al. | 315/312 |
| 4,213,182 | 7/1980 | Eichelberger et al. | 315/312 |
| 4,317,071 | 2/1982 | Murad | 315/312 |
| 4,489,385 | 12/1984 | Miller et al. | 315/312 |
| 4,550,276 | 10/1985 | Callahan et al. | 315/312 |

OTHER PUBLICATIONS

"Lutron Ballroom Lighting Dimming System," 1982.
"Lutron Versaplex Program Interface Control Panel and Versaplex Slide Controls for Partition to Meeting Rooms, Lecture Halls, Ballrooms, and Convention Centers," 1987.

Primary Examiner—Leo H. Boudreau
Assistant Examiner—Mark R. Powell
Attorney, Agent, or Firm—Klarquist, Sparkman, Campbell, Leigh & Whinston

[57] ABSTRACT

A multi-room controller for controlling a plurality of individual light controls, each associated with a room of a partitionable space. The individual light controls each control the light individually in the control's room. An assignment panel associated with the multi-room controller is operable to link several individual light controls in a group under the control of a selected individual control within the group. This linking occurs when several rooms have been combined into a larger room and it is desirable to have uniform control of the lighting within the larger room. The multi-room controller is in communication with each individual light control and responsive to the assignment panel for transferring control of the group to the selected individual light control. In one operation mode, the lighting is controlled by a preselected individual control. In another mode, the lighting is controlled by any of the linked controls in the group. All linked controls mimic the last activated control.

15 Claims, 5 Drawing Sheets

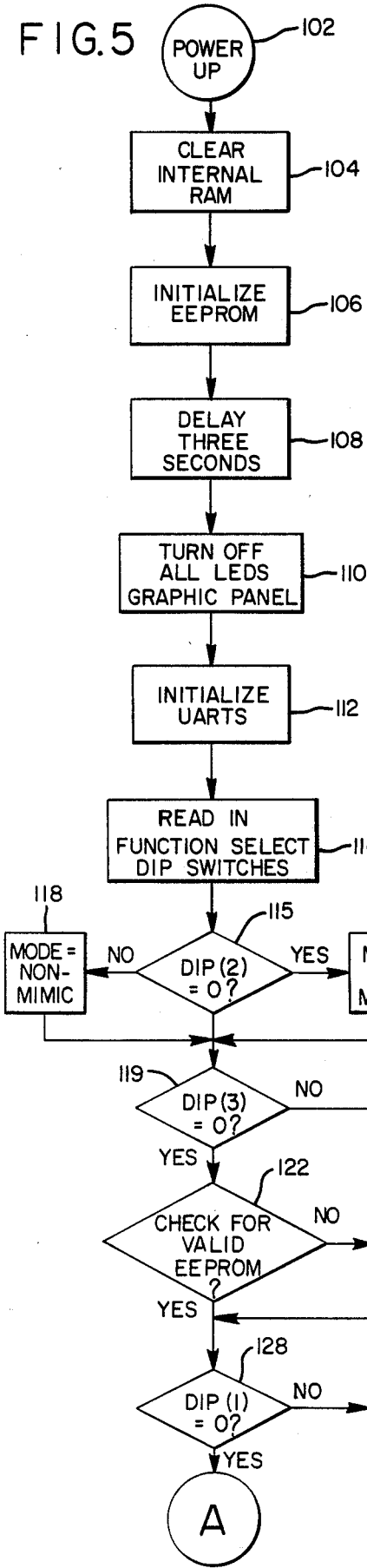
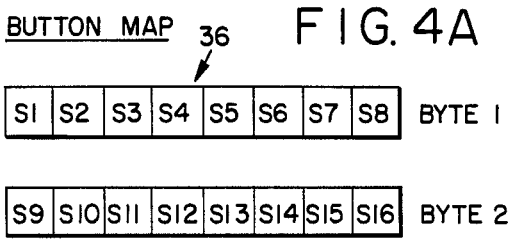
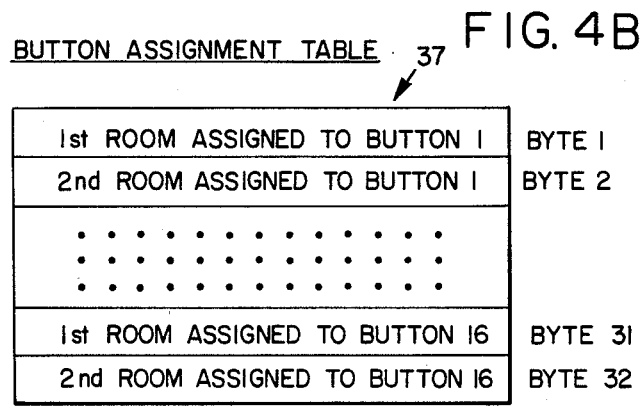
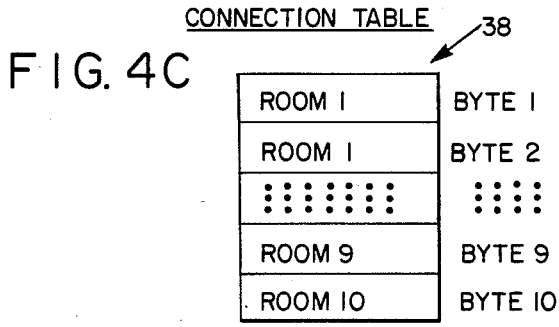

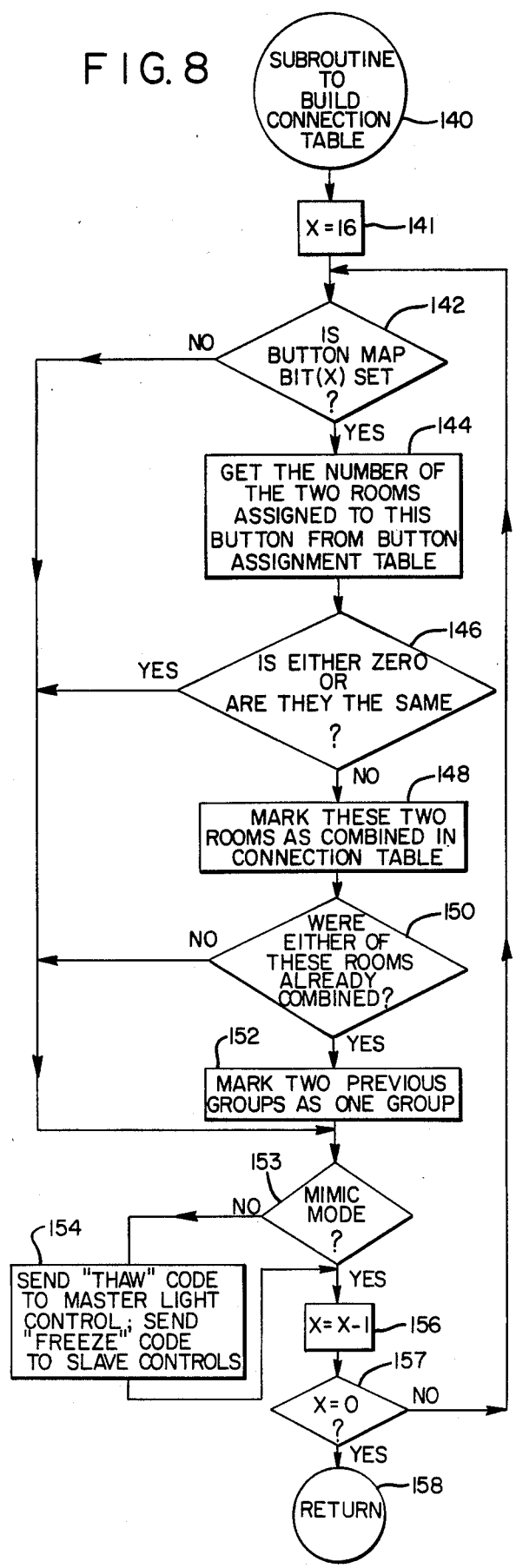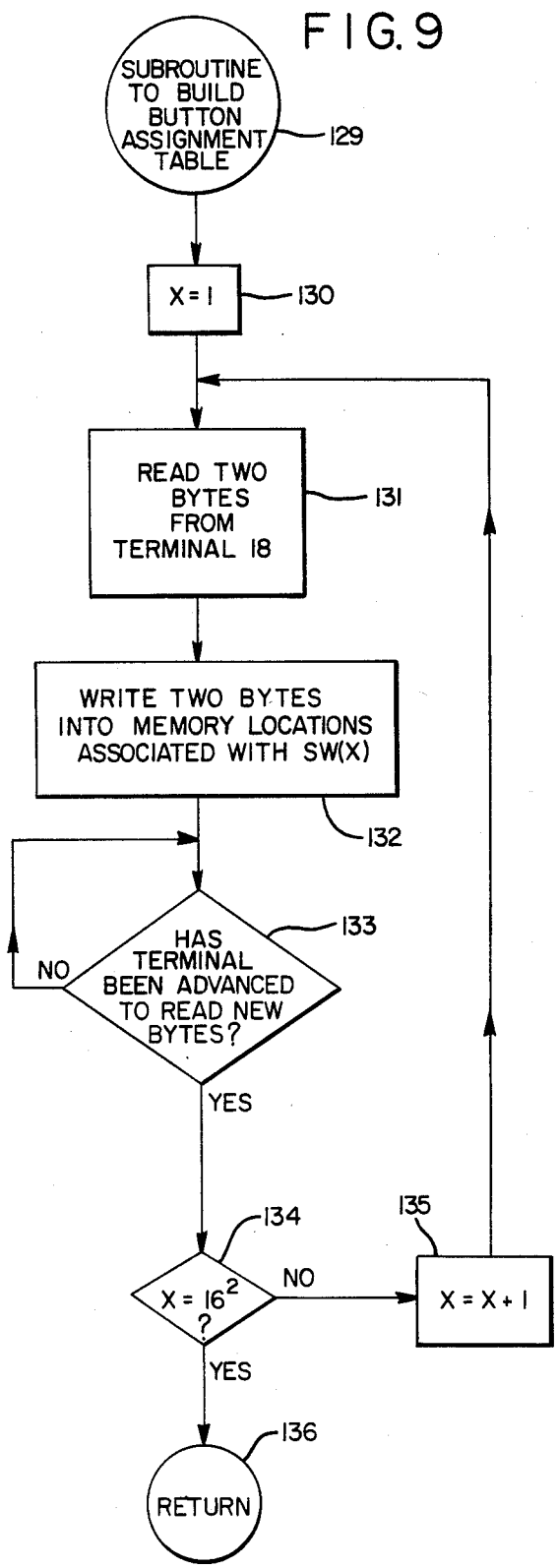

MULTI-ROOM CONTROLLED FOR INDIVIDUAL LIGHT CONTROLS

TECHNICAL FIELD

This invention relates to systems for uniformly controlling the lighting in a partitionable space. The space comprises multiple rooms, each with individual light controls for controlling the lighting individually in each room. More particularly, this invention relates to an apparatus for linking the individual light controls in a group and transferring the control of the group to a selected individual control. Such uniform control of the lighting is desirable where multiple smaller rooms of the partitionable space are being combined into a larger room.

BACKGROUND OF THE INVENTION

Most meeting facilities such as hotels and convention centers have large meeting spaces that can be subdivided into multiple rooms by movable partitions. These partitions allow different rooms within the space to be created to accommodate different uses. Each minimum-sized room requires an individual light control for controlling the lighting within the room. Typically, these controls are mounted on a permanent outer wall of the room. Each individual light control in turn is connected to a dimmer bank that directly controls the intensity of the lighting within the room. The lighting will normally comprise several sets of lights such as down lights, wall sconces, and track lights which each can be set independently at a different level of intensity.

When multiple smaller rooms are combined into a larger room, it is often desirable that the lighting be uniform throughout the larger room. Traditionally, this has required manually adjusting all the individual light controls to the same settings. But this method is subject to a number of drawbacks. For one, it is laborious and time consuming, requiring one to adjust each control to the desired setting. If the intensity of any of the lighting is to be changed thereafter, all controls must again be manually adjusted. Another drawback of the method is that it is unreliable. Because of the labor involved, the adjustment is usually done by a number of workers unfamiliar with light controls who can easily make mistakes and forget setting instructions. An additional drawback is the possibility of an unauthorized change in the lighting. The controls are often located in areas easily accessible to the room's occupants. To prevent an unauthorized change in the lighting, a lock must be mounted on each individual light control. These locks often take the form of a clear plastic case that is costly and unattractive.

Several vendors, aware of these drawbacks, offer means for "wiring up" the individual light controls together through a common connection point such as a panel of switches. The panel operates lkke an interchange with all the individual light controls and all the associated dimmers wired to the panel. Switches on the panel are then operable to connect a selected light control to several dimmers when the room associated with the several dimmers are combined.

The use of such a switch panel is one solution to the drawbacks herein mentioned, but it has its own disadvantages. The single selected control is the only means for controlling the lighting in the combined rooms. This arrangement thus sacrifices local control to a possibly remote selected control.

A major disadvantage is the lack of versatile control. An individual control whose dimmer is switched to another light control is "locked out" and will not control any lighting. Another disadvantage is the cost. These panels must be wired up on-site for the customer's needs. The wiring requires skilled labor and extensive wiring from each control to the central connection and then back to each dimmer. The extensive wiring may require conduit shielding as well to prevent interference with other electrical conductors in the area. The control connection panel must then be wired correctly with each set of wires to the appropriate terminals.

Still another disadvantage is the inflexibility of the panel connections. Once established, it is difficult to change which light controls will control which dimmers without extensive rewiring.

SUMMARY OF THE INVENTION

An object of the invention therefore is to provide a multi-room controller for linking the individual light controls in a partitionable space together under the control of a selected individual control.

Another object of the invention is to provide a multi-room controller whose linking of individual controls can be changed on-site without physically rewiring the controller or light controls.

Still another object of the invention is to simplify the installation of such a multi-room controller by utilizing digital rather than analog signal transmission between individual light controls and the multi-room controller.

Yet another object of the invention is to provide a lighting control system that causes the linked individual light controls to change their settings to the setting of a selected light control upon actuation of the control.

Yet another object of the invention is to provide a lighting control system that avoids the need to wire all the individual controls and dimmers to a common point.

To achieve these objects, a multi-room controller according to the invention comprises assignment means for linking individual light controls together in a group for control by a selected individual control within the group. Controller means in communication with each individual control and responsive to the assignment means transfers control of the group to a selected individual control. The selected individual light control thereby can control through the controller means and group of linked controls the lighting in their rooms.

In one aspect of the invention, the multi-room controller includes mode means for determining the individual control that controls the group of linked controls. In one mode, an individual control is preselected for each group of linked controls and controls all lighting within the group. In another mode, the lighting in the combined rooms is controlled by any of the controls within the group.

In another aspect of the invention, the multi-room controller includes memory means for storing information identifying a group of linked controls and the assignment means comprises a plurality of switches associated with the memory means. When the switch on the assignment means is activated, the memory is read and the controls therein are linked. The memory means is nonvolatile and reprogrammable so that the linked controls within a group may be changed.

The assignment means may comprise a graphic assignment panel comprising contact button switches. Alternatively, the assignment means may comprises a plurality of thumbwheel switches.

The controller means within the multi-room controller may comprise I/O means for two-way communication with the individual light controls and the assignment means. It may also include memory means for storing information received through the I/O means which indicate the group of individual controls linked and their present settings. central processing means is present for transmitting the setting of the individual light control controlling the group to all controls within the group. The I/O means is adapted to communicate serially with the individual light controls over a twisted pair of wires.

The foregoing and other objects, features, and advantages of the invention will become more apparent from the following detailed description of preferred embodiments which proceed with reference to the accompanying drawings.

BRIEF DESCRIPTION OF THE DRAWINGS

FIGS. 4A-4C are memory diagrams indicating stored data for the linking of the individual light controls.

FIG. 5 is the first portion of a flowchart illustrating the operation of the invention.

FIG. 8 is a fourth portion of the flowchart, specifically a subroutine called in the second portion.

FIG. 9 is a fifth portion of the flowchart, specifically a subroutine callable in the first portion.

DETAILED DESCRIPTION

Overview

Figure 1:
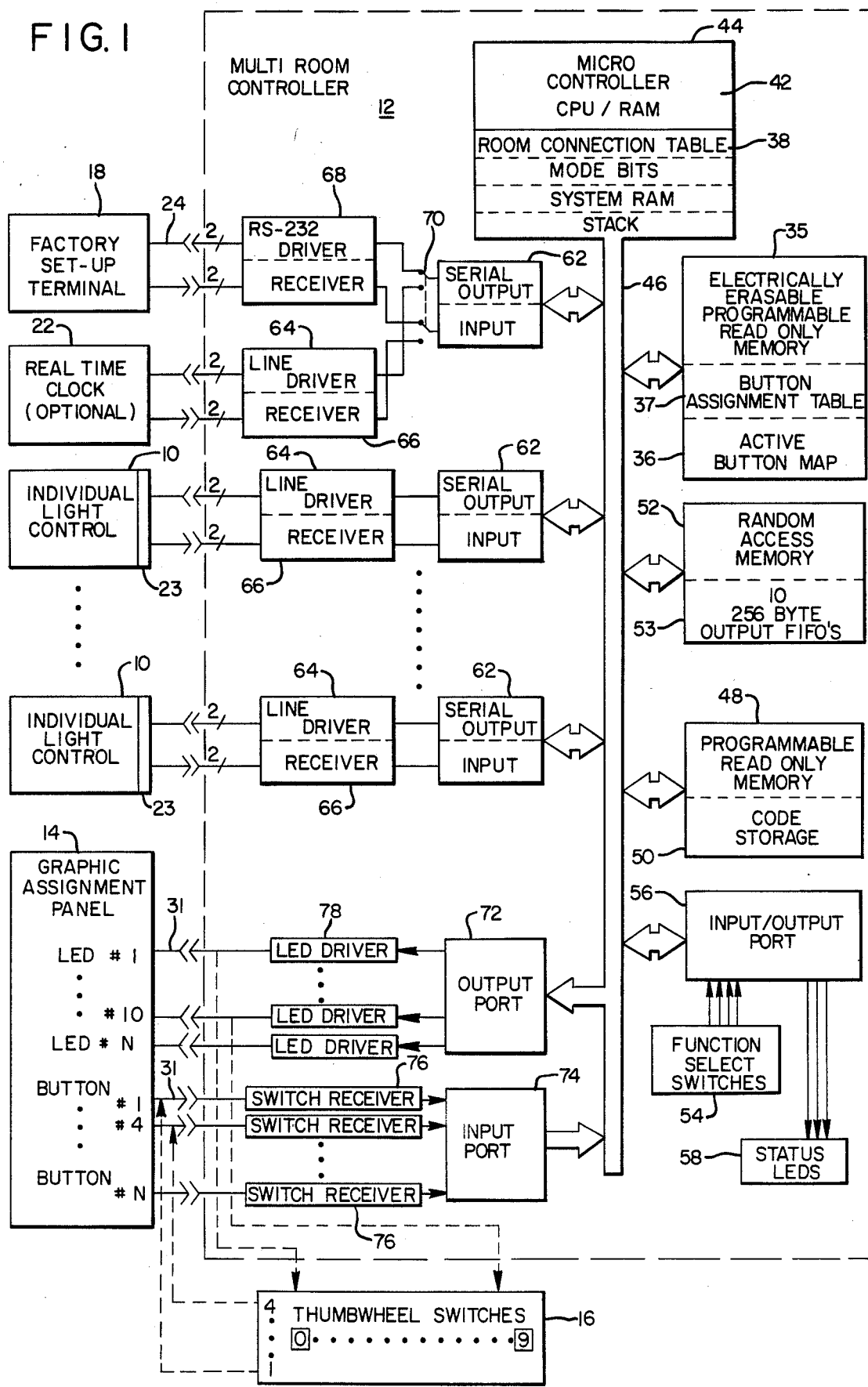
FIG. 1 is a block diagram of a multi-room controller and lighting control system according to the invention.

A lighting control system according to the invention is shown in FIG. 1. The system includes a plurality of individual light controls 10 each connected to a multi-room control 12. Each of the individual light controls 10 is adapted to be mounted in a separate room of a partitionable space to control the lighting in that room. Each light control 10 is also connected to an associated dimmer (not shown). The dimmer is responsive to a control signal from the light control to limit the intensity of lighting in the room. The light controls 10 each act separately to control the lighting in their respective rooms when the individual rooms are defined by the partitions. The multi-room controller 12 is adapted to link these individual controls 10 together when partitions have been removed and the individual rooms combined into a larger room. By so linking the controls 10, the lighting can be controlled uniformly by a seleceed control within the larger room without the need for individually adjusting each control.

Which individual controls 10 are to be linked and when is determined by an assignment means for assigning control of a larger room to a selected control. In FIG. 1, the assignment means comprises a graphic assignment panel 14 with an array of button switches. Alternatively, the assignment means may comprise a set of multiple setting switches such as thumbwheel switches 16 that communicate with the multi-room controller 12. On the panel 14, each switch and associated LED represent the state of a partition between two rooms that each have an individual control 10. In one position, the switch indicates the partition is open and the adjacent rooms are to be considered combined. In the other position, the switch indicates the partition is closed and the adjacent rooms are to be considered separate. The controller 12 responds to the movement of a switch by linking electronically the individual controls 10 of the rooms associated with the particular switch and transferring control of the group to a selected individual control.

The multi-room controller 12 has presently two operational modes for determining which individual control 10 in a linked group will control the lighting in the combined rooms. In a master-slave mode, a preselected control from the linked group controls all the individual controls 10 within the group. All the light controls within the group respond only to the pushbutton or switches on the preselected control. The nonselected controls 10, however, do not respond to their own switches and are effectively "locked out" of lighting control. In a mimic mode, each of the controls 10 will mimic any other control activated within the group. For example, if a first individual control 10 in the linked group is activated to raise light intensity, all controls 10 will respond by raising the intensity of the respective lights in their rooms. If a second control in a group lowers light intensity, all individual controls correspondingly lower the intensity of their respective lights. Individual controls 10 often have a number of raise/lower switches to control different types of lighting. Each type of lighting will respond to the last switch activated that controls the lighting. In this circumstance, one control 10 could be activated to set overhead lighting, for example, while another control 10 could simultaneously be activated to set recessed lighting.

The multi-room controller in the present embodiment is microprocessor-based. The controller 12 includes a memory that stores information identifying the individual controls 10 to be linked in response to activation of a switch on panel 14. The controller also includes a central processing unit that links the controls 10. This information can be programmed in the controller 12 at the factory or can be reprogrammed on the job site through a portable setup terminal 18. Once such terminal for programming the controller is the G. R. Electronics Ltd., Pocket Type 14. This setup terminal can be plugged into the multi-room controller to reconfigure the groups of linked controls if so desired.

Unlike prior art lighting control systems, the individual light controls 10 in the present embodiment are not connected through a central connection point to the dimmers associated with the other light controls. Rather, the individual light controls 10 signal each other within the linked group to operate their respective dimmers according to the operational mode. By following this system of control, wiring connections are minimized. Moreover, the group of rooms associated with each switch of the graphic assignment panel 14 can be reconfigured by the setup terminal 18. No physical wiring changes are required to change the group of linked individual controls within the group.

FIG. 1 also shows an optional real time clock 22 connected to the multi-room controller 12. The clock provides time signals that enable the controller to link the controls 10 automatically at preselected times and set the lighting accordingly. At the end of the day, for example, all individual light controls 10 together could be ordered to bring the light intensity to maximum throughout the partitionable space for ease of cleaning the space.

System Design

Individual Light Controls

The light controls 10 shown in FIG. 1 are based on a conventional design improved to enable them to communicate with the controller 12. Examples of such light controls are the Lytemode Systems line manufactured and sold by the Lightolier Corporation. A light control 10 typically has several raise/lower switches that each control a dimmer for a light within the room. The control 10 may also include number of buttons for presets that each automatically adjust the switches to a predetermined setting. These controls 10 are connected directly to the dimmer bank (not shown) for controlling the intensity of the lighting within the respective room. The control signals generated by this control 10 to its dimmer are analog voltages, typically with a range from zero to ten volts. Each dimmer responds to the amplitude of the voltages to set the lighting intensity accordingly.

These individual lighting controls 10, however, are adapted to enable them to communicate with the controller 12 by the addition of means such as a serial I/O port 23. Through this port 23, each control 10 can transmit a digital signal comprising data codes to the controller 12 and receive instructions and data therefrom. The instructions, as will be explained, dictate whether the particular control 10 is to "freeze" its own switches so that they do not respond to manual operation or to "thaw" and so respond. In the master-slave mode of operation, the "freeze" instruction is sent to all slave controls 10, effectively locking their switches out. In the mimic mode, the "thaw" instruction is sent to all linked controls 10 in the group so that all can transmit to other controls in the linked group.

Because of the digital nature of communication, each light control 10 and the controller 12 are connected by twisted pairs 24 of telephone wire rather than wire required for analog signals in prior systems. The twisted pairs 24 are capable of transmitting the digital signal at up to 1200 baud without measurable signal degradation.

Graphic Assignment Panel

Figure 2:
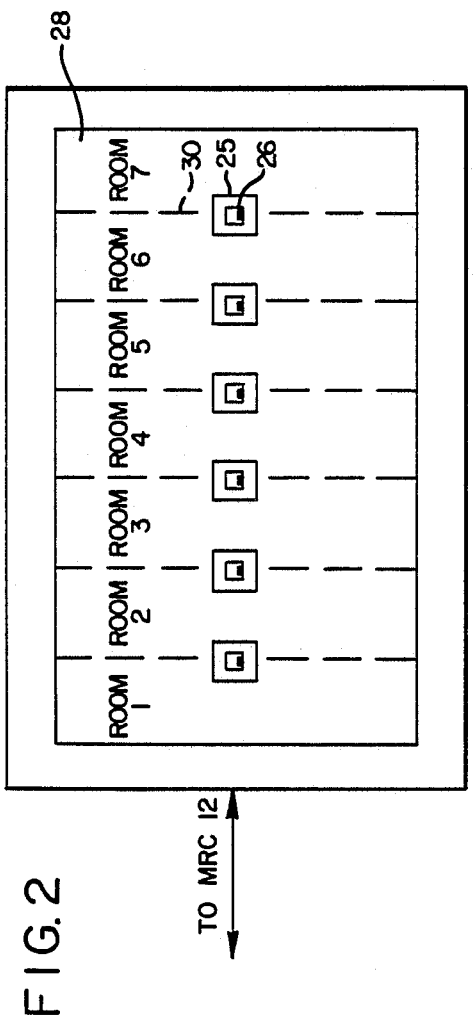
FIG. 2 is a pictorial view of a graphic assignment panel according to the invention.

An example of a graphic assignment panel 14 for selectably linking controls 10 is best seen in FIG. 2. The panel 14 comprises a number of momentary contact button switches 25 that each include an LED 26. The panel includes a graphic surface 28 showing the partitionable space, with dashed lines 30 indicating movable partitions. Each line 30 is straddled by a switch 25. The LED 26 is activated by alternate presses of the surrounding button switch 25. An LED that is lighted indicates the respective partition is open; an LED that is off indicates the respective partition is closed.

Each button switch 25 and its associated LED 26 may communicate digitally with the controller 12 through twisted pairs 31 of telephone wires indicated as in FIG. 1. This communication enable the panel 14 to be located remotely from the controller 12 if desired. Panel 14, for example, could be located at the entrance of the partitionable space and the controller 12 located in an electrical closet.

In the embodiment shown in FIG. 1, sixteen button switches and sixteen LEDs are illustrated for sixteen possible room combinations. These room combinations can include the combining of nonadjacent rooms as well as adjacent rooms as depicted on the panel 14.

Thumbwheel Switch Panel

Figure 3:
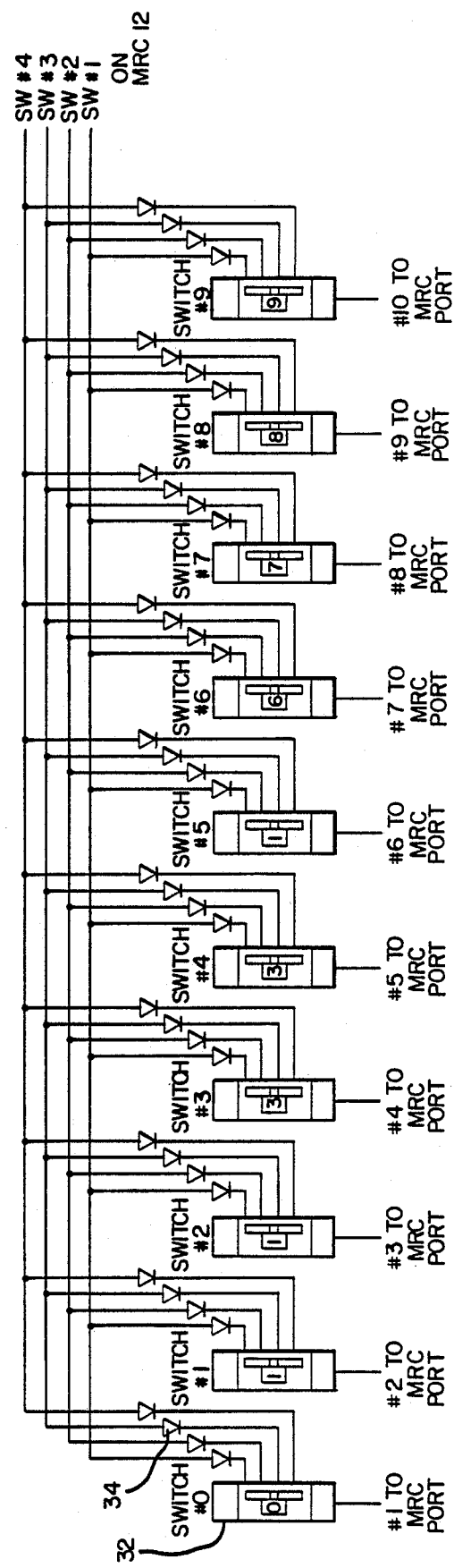
FIG. 3 is a pictorial view of a thumbwheel switch panel according to the invention.

The thumbwheel switch panel 16 shown in dashed lines in FIG. 1 is an alternative to the graphic assignment panel 14. An example of panel 16 is illustrated in detail in FIG. 3. It comprises a bank of thumbwheel switches 32 each representing a room of the partitionable space (in this example ten rooms are shown numbered respectively 0 to 9). The switch 32 outputs a BCD signal from 0 to 9. The switch 32 is dialed to the number of the room whose light control 10 will control the lighting in the room represented by the switch. Rooms are combined under the control of a single control 10 by dialing that control's room number into two or more switches. At the present settings of the switches 32 shown in FIG. 3, the lighting in room 0 is controlled by its own controller 10. The lighting in rooms 1, 2, and 5 is under control of the light control 10 in room 1. The lighting in rooms 3 and 4 is under the control of the light control 10 in room 3. The rest of the rooms are assumed partitioned and the lighting in each remains subject to its own individual light control 10.

The switch 32 output signals are mutliplexed together onto four input lines to the controller 12. The controller reads each switch sequentially by activating a port on the controller 12 associated with each switch. This action completes a circuit through each switch 32, enabling its output to appear across isolation diodes 34. The diodes 34 associated with the nonconnected switches prevent their output from appearing on the input lines.

Multi-room Controller

FIG. 1 also shows a diagram of the circuit blocks copprising the multi-room controller 12. Looking first to the right side of the diagram, an electrically erasable programmable read only memory (EEPROM) 35 is represented that includes within its memory an active button map 36 and a button assignment table 37. The map 36 keeps track of which button switches 25 have been activated to indicate two or more rooms have been combined. FIG. 4A shows the construction of the button map 36. It comprises two bytes in EEPROM memory with each bit location S1 through S16 representing the status of a button switche 25 on the panel 14. A logical 1 indicates that the partition is open (rooms combined) and a logical 0 that the partition is closed (rooms partitioned). The button assignment table is shown in FIG. 4B. In the present embodiment, it occupies thirty-two bytes in EEPROM memory with two bytes assigned to each button switch 25 on the panel 14. An identification code representing the room assigned to a particular button switch is stored in each byte. These room assignments to a button switch are initially made at the factory prior to shipping from information furnished by the customer. But the assignments can be changed on-site by reprogramming the EEPROM through the portable terminal 18, as will be explained hereinafter.

The button assignment table 37 and active button map 36 are used by the central processing unit 42 of a microcontroller 44 to construct a room connection table 38 within the microcontroller's internal memory. FIG. 4C shows the information stored within the room connection table. The addresses for bytes 1 through 10 of the table 38 represent the rooms 1 through 10. The content of each byte identifies the room whose light control 10 controls the lighting of the addressed room. Table 38 is therefore similar in operation to the thumbwheel switch panel 16. In FIG. 4C, for example, rooms 1 and 2 are both controlled by the light control 10 in room 1. Rooms 9 and 10 are each controlled by its own light control. The table is constructed by reference to the button map 36 and the button assignment table 37, as will be explained hereinafter.

Communication within the controller 12 occurs over a bus 46 that links the microcontroller 44 to the EEPROM 35 as well as to the other circuit elements within the controller. The microcontroller 44 fetches its instructions from an EPROM 48 that stores the instruction code 50 for the controller's operation. Read/write memory is provided by a RAM 52 that is organized into ten 256 byte output FIFOs 53 (first in, first out). The data codes received from the ten light controls 10 are read by the microcontroller 44 and then stored in and transmitted from these FIFOs 53 by the microcontroller 44 in the order in which the codes arrive.

The means for determining the operation mode of the multi-room controller 12 comprises function select DIP switches 54 that communicate with the central processing unit 42 through a I/O port 56 on the microcontroller 44. In the present embodiment, such switches can be set to select between the master-slave and mimic modes of operation, as well as select diagnostic programs for testing the operation of the controller 12. The diagnostic programs include tests to check the operation of the button switches 25, the RAM 52, and the EEPROM 35. The performance of the tests can be visually verified by viewing a series of status LEDs 58 that are also connected to the I/O port 56. The LEDs 58 illuminate in predetermined patterns to indicate passage or failure of a test. In normal operation of the controller 12, they execute a "chase" pattern.

The microcontroller 44 communicates with the individual light controls 10, setup terminal 18, and real time clock 22 through serial I/O ports 62. In the present embodiment, these ports comprise clocked UARTs that receive a signal in parallel from the microcontroller 44 and transmit the signal serially. For the real time clock 22 and each of the individual light controls 10, the serial output is routed through a line driver 64 that amplifies the signal and transforms it from a single ended signal to a differential signal for transmission along a twisted pair 24. The data codes received from each light controls 10 are routed through a line receiver 66 that optically couples the data to the serial input of port 62 and transforms the data to a single-ended signal. This optocoupling minimizes ground loops and the noise that would otherwise interfere with the transfer of the data codes from a light control 10 to controller 12. For the setup terminal 22, an RS232 driver/receiver 68 is utilized for transmitting data to and from the terminal 18 through a plug-in socket (not shown). Port 62 is switched between the RS232 driver/receiver 68 and the line driver 64/receiver 66 by a multiplexer 70 controlled by a jumper connection (not shown).

Communication with the graphic assignment panel 14 (or the alternative thmmbwheel switch panel 16) and the microcontroller 44 is through an output port 72 and an input port 74. In the present embodiment, such ports exist on the UARTs that also serve as the serial I/O ports 62. Signals produced by the pressing of button switches 25 on the panel 14 are routed through switch receivers 76 to input port 74. These switch receivers optically couple the switch signals to the controller 12. Signals from the microcontroller 44 responsive to pressing of switches 25 are routed through the output port 72 and LED drivers 78 to turn associated LEDs 26 on or off. Such drivers 78 are also optocouplers. In the case of hhe thumbwheel switch panel 16, the thumbwheel switches 32 are polled by the microcontroller 44 as previously described.

The controller 12 is powered by onboard linear power supplies (not shown). The supplies deliver voltages for powering separately the digital logic of the controller and the switch receivers 76/LED drivers 78. The two supplies are provided to maintain the isolation between the panel 14 and controller 12. The light controls 10 are also powered separately so that a power failure affecting the controller will not interfere with the individual operation of the light controls. In addition, the controller 12 includes a RESET generation circuit to ensure proper restart of the control program after power up of the controller or a temporary power loss.

The embodiment shown in FIG. 1 is but one example of how controller 12 can be constructed according to the invention. Each element therein in turn may comprise any number of exemplary circuit elements. Table I below provides a list of such circuits. Their particular pin interconnections can be determined by one skilled in the art from applicable documents such as THE MICROCONTROLLER HANDBOOK, Intel (1986); THE LINE DRIVER AND RECEIVER DATA BOOK, Texas Instruments (1984); etc.

TABLE I

| Circuit Element | Designation |
| --- | --- |
| Microcontroller 44, serial I/O port 56 | 8051 |
| EEPROM 35 | X2864A |
| RAM 52 | HM6264 |
| EPROM 48 | 27128 |
| LED drivers 78, switch receivers 76 | PS2401A-2 |
| RS232 driver/receiver 68 | DS1489 |
| Line driver 64 | µA9638 |
| Line receiver 66 | 6N138 |
| Serial I/O port 62, output port 72, input port 74 | SCN2681 |
| Multiplexer 70 | 74HC157 |

System Operation

The multi-room controller 12 operates according to a computer program represented by code storage 50 of EPROM 48. FIGS. 5 through 9 illustrate that operation. It should be understood that the flowcharts illustrate but one sequential method of operating the multi-room controller and that the steps could be performed in other orders as well. For clarity, the steps of operation are referenced by numbers in parentheses.

FIG. 5 shows the steps the controller 12 executes on power up or reset (102). The microcontroller 44 first clears its internal RAM, including the room connection table 38, mode bits indicating the operation mode, and a stack pointer that points to the address within the output FIFOs 53 of RAM 52 (104). The microcontroller then initializes EEPROM 35 by writing to a known location and checking the EEPROM's operation (106). Further operation is delayed three seconds (108) to ensure that individual light controls 10 connected to the controller 12 are up and running before data and instructions are transmitted to them by the controller. At this point, the button switches 25 on the panel 14 may be randomly lit. The microcontroller 44 therefore turns off all the LEDs 26 (110). It then initializes the UART as the serial I/O ports 62 and the input and output ports 72, 74 (112).

The function switches 54 are now read (114). If DIP switch 2 is clear (115), then the controller 12 is in the mimic mode (116) of operation. If DIP switch 2 is set, then the controller 12 operates in the master-slave mode (118). A DIP switch 3 is then checked (119) to see if diagnostic programs are to be executed (120). If set, the tests previously described are given. If clear, the program proceeds directly to check for the presence of the EEPROM 35 by attempting to read from the address previously written to (120). If the thumbwheel switch panel 16 is in use, hhe EEPROM 35 cannot be read and the microcontroller 44 will detect the absence of the EEPROM. It responds by setting a wheel bit in its internal memory (124). It then jumps ahead to further execution of the program through loop (126) in FIG. 6. However, if the EEPROM is present, then the program proceeds to check DIP switch 1 to see if the switch is set for reprogramming the EEPROM (128). If the DIP switch is so set, then the EEPROM is ready for on-site reprogramming by the setup terminal 18 through subroutine (129). If clear, the program continues directly into FIG. 6.

FIG. 9 shows generally the subroutine (129) for programming the EEPROM 35 on-site with the terminal 18. A counter variable is set corresponding to the first button switch 25 of panel 14 (130). Th microcontroller 44 then reads through the RS232 driver/receiver 68 two bytes that have been entered via terminal 18 (131). These bytes are written into EEPROM memory at the first two addresses of the button assignment table 37 (132). The microcontroller then waits until the terminal has been advanced by a "carriage return" or "enter" signal (133). It then proceeds to read new bytes until all bytes associated with these switches have been written into the table 37 (134, 135). The microcontroller is then returned (136) to the main program by manually clearing DIP switch 1.

Figure 6:
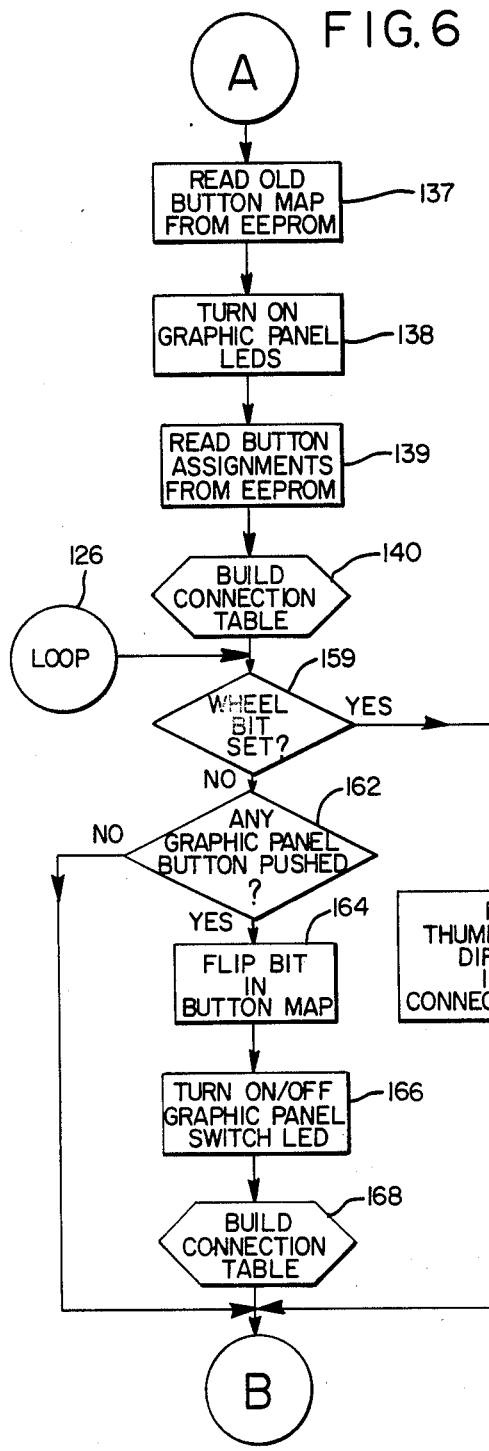
FIG. 6 is a second portion of the flowchart.

At step (136) on the top of FIG. 6, the microcontroller 44 reads the "old" button map 36 stored in the EEPROM 35. This map represents the state of the buttons stored before the controller 12 was last turned off or power failed. After reading the button map, the microcontroller 44 activates the corresponding LEDs 26 on panel 14 (137). The microcontroller then reads the button assignment table 37 from the EEPROM 35 (138) and with the button map 36 proceeds to build the room connection table 38 (139) in the microcontroller's internal memory.

FIG. 8 illusrrates the operation of the subroutine (140) for building the connection table. A counter variable equal to the number of buttons in the map 36 is set (141) and each bit S1 through S16 corresponding to switches 25 is read (142). If a bit is set, the microcontroller 44 reads the two room nubbers assigned to the respective button switch from the button assignment table 37 (144) and determines if either room number is a zero or both are the same number (146). If the answer in either case is affirmative, then no room combination takes place when the switch is activated. This condition occurs if a button switch is not assigned to a partition or if a room is not to be placed under the control of another light control 10. If the room numbers are different, they are to be combined when the switch 25 is activated. The rooms are so marked in the connection table 38 (148). This marking comprises placing the lowest room number in each group at each of the addresses or the rooms in the group. For example, if rooms 1 and 2 are assigned to button switch S1 in the button assignment table 37 and the switch 25 represented by S1 is pressed, then the connection table 38 will contain the identification code for room 1 in both byte 1 and byte 2. In the program, the lowest room in each group becomes the preselected light control 10 in the master-slave mode of operation. The table 38 is then checked to determine if either of these rooms have already been combined (150). If they have, the two groups of rooms are combined into a single group (152).

The microcontroller 44 now transmits instructions to the individual light controls 10 if the master-slave mode of operation has been selected through DIP switch 2. The microcontroller 44 reads switch 2 to determine if the mimic mode is operable (153). If not, the master-slave mode has been selected. A "freeze" code is then sent to all linked controls 10 except for the selected conrrol identified in the connection table 38 (154). The "freeze" code prevents the individual light controls from sending data codes to the controller 12 but allows them to receive and react to such data codes by adjusting their lighting appropriately. The master light control 10 receives a "thaw" code, enabling it to both transmit data codes to other controls 10 and receive instructions from the controller 12. The above steps are repeated to build the connection table as the counter variable is then decremented (156) until zero (157) and all sixteen bit locations S1-S16 are checked.

The subroutine (140) returns (158) with the newly built connection table to the main operation as indicated in FIG. 6. At this point, the loop (126) on FIG. 5 intersects the flowchart. This intersection occurs because the thumbwheel switch settings mirror the room connection table 38. The wheel bit of step 124 is then checked to see if it is set (159) and if so, the thumbwheels are read directly into the connection table (160). The thumbwheel switch values are incremented by one to adjust the BCD values to the corresponding connection table range of 1 to 10 and are then written to memory without need for the EEPROM 35. If the wheel bit is clear, the graphic panel button switches 25 are polled to determine if any switch has been pushed since the button map was last read (162). If so, the button map (now stored in system RAM of the microcontroller 44) must be updated and the bit location representing the button is flipped (164). The microcontroller 44 then proceeds to turn on or off the appropriate LEDs 26 on the graphics panel 14 (166). The connection table is again built in light of the change in the button map 36 (168). The table 38 is thus continuously updated as button switches are pressed on panel 14.

Figure 7:
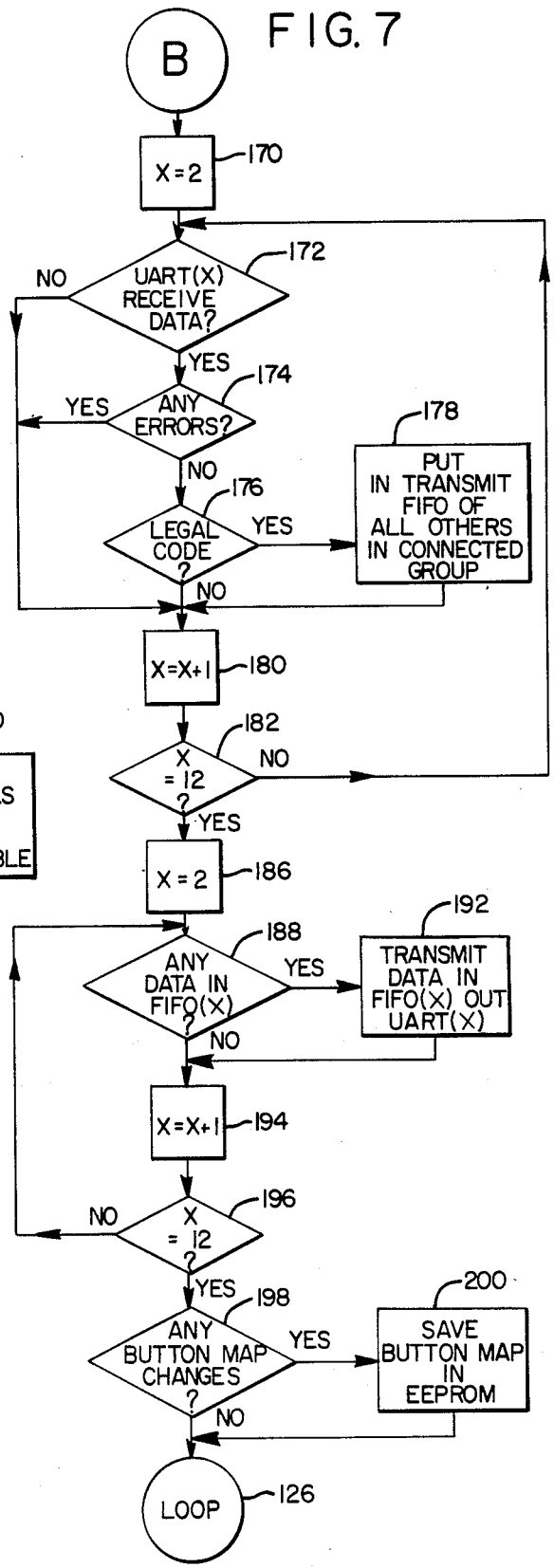
FIG. 7 is a third portion of the flowchart.

FIG. 7 illustrates the steps taken by the microcontroller 44 to monitor the individual light controls 10 and to transfer data codes from one linked control 10 to another. A counter is first set to the value of 2 corresponding to the first serial port 62 (UART) that is to be addressed by the microcontroller 44 (170). The microcontroller then reads the UART to determine if it has received a data code from its associated individual light control (172). The reception of a data code indicates a switch on the control 10 has been activated. If data has been received, the microcontroller 44 checks to see if the data contains any errors in transmission (174) and if not, if it is a legal code (176). Assuming no error and a legal code, the data code is written into the transmit FIFO 53 of all other UARTs in the linked group of light controls (determined from the connection table 38) (178). The counter variable is then incremented (180) and the procedure repeated until all UARTs connected to a light control 10 have been polled (182).

A similar procedure is used to read the data codes in the FIFOs 53 and write the data to the UARTs in a linked group. A counter variable is again set at 2 (186), and the corresponding FIFO 53 is read to determine if a data code is stored therein (188). If so, the data code is transmitted out through the respective UART to the associated light control (192) to control the lighting in that respective room. The counter variable is then incremented (194), and the procedure repeated until all FIFOs 53 connected to a light control 10 have been read and data codes stored therein written to the connected light control (196).

Any button map changes that have been detected (198) are now saved in the EEPROM 35 (200). The stored button map becomes the "old" button map of step (136). Upon a reset or power up of the controller 12, the lighting throughout the partitionable space will then be reset to its previous level through the power up sequence starting with step (102). In the normal continuous operation, however, the microcontroller 44 loops back to the entry of loop (126) on FIG. 6 and continues to execute the main program indefinitely.

Having illustrated and described the principles of the invention in preferred embodiments, it should be apparent to those skilled in the art that the invention can be modified in arrangement and detail without departing from such principles. We claim all modifications coming within the spirit and scope of the following claims.

We claim:

1. A multi-room controller for controlling a plurality of individual light controls, each light control adapted to control directly lighting within an associated room of a partitionable space and to respond to other light controls that can indirectly control the lighting, comprising:

assignment means operable for linking individual light controls in a group for control by each individual control within the group; and controller means in communication with each individual control and responsive to operation of the assignment means for enabling each individual light control within the group of linked controls upon activation to control the lighting within the rooms associated with the group, the lighting thereby responsive to each of the linked individual light controls.

2. The multi-room controller of claim 1 including mode means for determining the selected individual control, the mode means determining in one mode that the selected control is an individual control preselected for each group of linked controls and determining in another mode that the selected control is the individual control last activated within the group.

3. The multi-room controller of claim 1 in which the controller means includes memory means for storing information identifying a group of linked controls and the assignment means comprises a plurality of switches associated with the memory means that each select a corresponding group of linked controls, the switches representing rooms to be combined.

4. The multi-room controller of claim 3. in which the memory means is nonvolatile and reprogrammable to change the identification of the linked controls within a group selected by a switch.

5. The multi-room controller of claim 1 in which the assignment means comprises a plurality of multiple setting switches, each corresponding to a room and each containing settings corresponding to rooms within the partitionable space, the lighting in each room controlled by the individual light control set in the corresponding switch, a group of individual controls linked by setting the corresponding switches to the same setting.

6. The multi-room control of claim 1 in which the controller means comprises:

I/O means for two-way communication with the individual light controls and the assignment means;

memory means for storing information received through the I/O means indicating the groups of individual controls linked and their present settings; and central processing means for transmitting the setting of the individual light control that controls a group to all the controls within the group.

7. The multi-room controller of claim 6 in which the I/O means is adapted to communicate serially with the individual light controls over a twisted pair of wires.

8. A lighting control system for controlling the lighting in multiple rooms of a partitionable space, comprising:

a plurality of individual light controls each having switch means for controlling directly the lighting individually in an associated room of the space and having I/O means for communicating the switch settings to other individual light controls for indirect control of lighting in other rooms;

assignment means operable for linking individual light controls in a group for control by each individual control within the group; and controller means in communication with each individual control and responsive to operation of the assignment means for receiving the switch settings and communicating said switch settings to the other individual light controls within the group to enable each individual light control to control directly or indirectly via its switch means the lighting within the rooms associated with the groups, the lighting thereby responsive to each of the switch means as it is activated.

9. The lighting control system of claim 8 in which the controller means includes mode means for determining that the selected control is an individual control preselected for each group of linked controls.

10. The lighting control system of claim 9 in which the controller means includes mode means for determining that the selected control is the individual control last activated within the group of linked controls.

11. The lighting control system of claim 8 in which the controller means includes memory means for storing information identifying the linked controls, the individual light controls linked by the assignment means.

12. The lighting control system of claim 11 including means for reprogramming the memory means on-site.

13. The lighting control system of claim 8 including optocoupling means for optically coupling the controller means to the assignment means and to each of the individual light controls.

14. An individual light control for setting the lighting in a room, comprising:

central processing means for controlling directly the light intensity of the associated lights in the room; and I/O means for communicating light intensity information between the central processing means and other central processing means of other individual light controls to enable the individual light control to mimic the setting of the other individual controls.

15. The individual light control of claim 14 in which the I/O means is adapted to communicate serially with other individual light controls over a twisted pair of wires.

* * * * *

UNITED STATES PATENT AND TRADEMARK OFFICE
CERTIFICATE OF CORRECTION

PATENT NO. : 4,792,731

DATED : December 20, 1988

INVENTOR(S) : Gordon W. Pearlman, Steven B. Carlson

It is certified that error appears in the above-identified patent and that said Letters Patent is hereby corrected as shown below:

First page, the title "MULTI-ROOM CONTROLLED FOR INDIVIDUAL LIGHT CONTROLS" should read --MULTI-ROOM CONTROLLER FOR INDIVIDUAL LIGHT CONTROLS--.

Column 1, the title "MULTI-ROOM CONTROLLED FOR INDIVIDUAL LIGHT CONTROLS" should read --MULTI-ROOM CONTROLLER FOR INDIVIDUAL LIGHT CONTROLS--.

Column 1, line 59, "lkke" should be --like-- and line 63 "room" should be --rooms--.

Column 3,
line 11, before "central" insert --A--; and line 60, "seleceed" should be --selected--.

Column 5,
line 67, "enable" should be --enables--.

Column 6, line 44, "copprising" should be --comprising--.

UNITED STATES PATENT AND TRADEMARK OFFICE
CERTIFICATE OF CORRECTION

PATENT NO. :  4,792,731

DATED     :  December 20, 1988

INVENTOR(S) :  Gordon W. Pearlman, Steven B. Carlson

It is certified that error appears in the above-identified patent and that said Letters Patent is hereby corrected as shown below:

Column 8, line 2, "thmmbwheel" should be --thumbwheel-- and line 14, "hhe" should be --the--.

Column 9, line 23, "hhe" should be --the--; line 38, "Th" should be --The--; line 61, "illusrrates" should be --illustrates--; and line 66, "nubbers" should be --numbers--.

Column 10, line 29, "conrol" should be --control--.

Column 12, line 67, "identifing" should be --identifying--.

Signed and Sealed this

Nineteenth Day of December, 1989

Attest:

JEFFREY M. SAMUELS

Attesting Officer    Acting Commissioner of Patents and Trademarks